United States Patent
Tsai et al.

(10) Patent No.: US 7,019,796 B2
(45) Date of Patent: Mar. 28, 2006

(54) THIN FILM TRANSISTOR ELECTROSTATIC DISCHARGE PROTECTIVE CIRCUIT

(75) Inventors: Ja-Fu Tsai, Chiayi (TW); Wen-Chun Wang, Taichung (TW)

(73) Assignee: Wintek Corporation, Taichung (TW)

( * ) Notice: Subject to any disclaimer, the term of this patent is extended or adjusted under 35 U.S.C. 154(b) by 66 days.

(21) Appl. No.: 10/878,005

(22) Filed: Jun. 29, 2004

(65) Prior Publication Data

US 2005/0285984 A1    Dec. 29, 2005

(51) Int. Cl.
*G02F 1/1333* (2006.01)

(52) U.S. Cl. .............................. 349/40; 349/192

(58) Field of Classification Search .............. 349/40, 349/192, 139, 143; 257/59
See application file for complete search history.

(56) References Cited

U.S. PATENT DOCUMENTS

| | | | | |
|---|---|---|---|---|
| 5,373,377 A * | 12/1994 | Ogawa et al. | ................. | 349/40 |
| 5,671,026 A * | 9/1997 | Shiraki et al. | ................. | 349/40 |
| 5,909,035 A * | 6/1999 | Kim | ............................ | 257/59 |
| 6,388,719 B1 * | 5/2002 | Matsunaga et al. | ........... | 349/40 |
| 6,690,433 B1 * | 2/2004 | Yoo et al. | ..................... | 349/40 |

* cited by examiner

*Primary Examiner*—Kenneth Parker
*Assistant Examiner*—David Y. Chung
(74) *Attorney, Agent, or Firm*—Rosenberg, Klein & Lee

(57) ABSTRACT

A TFT ESD protective circuit disposed between a scanning signal line or a data signal line and a Vcom. The protective circuit includes a positive ESD protective unit and a negative ESD protective unit. Each of the positive static protective unit and negative static protective unit is composed of three TFT. In the case that the gate insulating layer of any of the three TFT is broken down by electrostatic voltage, the remaining two TFT can still normally operate and keep truly providing static protective function.

4 Claims, 3 Drawing Sheets

THIN FILM TRANSISTOR ELECTROSTATIC DISCHARGE PROTECTIVE CIRCUIT

BACKGROUND OF THE INVENTION

The present invention is related to a protective circuit for avoiding electrostatic discharge (ESD) damage. The ESD protective circuit is built in a driving matrix thin film transistor (TFT) liquid crystal display.

FIG. 2 shows a conventional driving matrix liquid crystal display 10 utilizing thin film transistor switch cells (TFTs). The liquid crystal display 10 includes multiple TFTs 2 arranged into a matrix and pixel capacitors 1 connected with the drains of the TFTs 2. The pixel capacitor 1 includes a liquid crystal capacitor 1a formed of a liquid crystal layer between pixel electrode and Vcom and a storage capacitor 1b parallel to the liquid crystal capacitor 1a. The other ends of the liquid crystal capacitor 1a and the storage capacitor 1b are electrically connected to an equal potential contact 4 disposed on a corresponding substrate. A scanning signal line 3 is electrically connected to the gate of the TFTs 2. The data signal line 5 is electrically connected to the source of the TFTs 2. The scan signal provided via the scanning signal line 3 makes the TFTs 2 in an on/off state. When the TFTs 2 is turned on, image signal voltage via the data signal line 5 is provided for the source of the TFTs 2 to charge the pixel capacitor to a voltage level corresponding to the source. The scan line and data line pads adapted to the driving chip are denoted by 8 and 9.

The TFT ESD protective circuit 7 is disposed between the scanning signal line 3 and the Vcom 6 (common electrode) and between the data signal line 5 and the Vcom 6. When electrostatic voltage is generated, the TFT ESD protective circuit 7 serves to eliminate the electrostatic voltage to protect the TFTs 2 from being damaged by electrostatic voltage. In manufacturing procedure of the liquid crystal display, the electrostatic voltage is generated easily when assembling the driving matrix substrate (on which switch cells are disposed), especially when arranging the ICs for driving the LCD on the driving matrix substrate.

FIG. 3 shows a conventional TFT ESD protective circuit 11. The TFT ESD protective circuit 11 includes two TFT diodes t1, t2 reversely connected. The pattern of the TFT ESD protective circuit symbol is as shown in FIG. 4. The gate electrode G and drain electrode D of the TFT t1 are short-circuited and connected to the scanning signal line 3 and the data signal line 5. The source electrode S of the TFT t1 is connected to the Vcom 6. The source electrode S of the TFT t2 is connected to the scanning signal line 3 and data signal line 5. The gate electrode G and drain electrode D of the TFT t2 are short-circuited and connected to the Vcom 6.

The TFT t1 of the TFT ESD protective circuit 11 is an element for discharging positive electrostatic voltage, while the TFT t2 of the TFT ESD protective circuit 11 is an element for discharging negative electrostatic voltage. When positive electrostatic voltage is generated, the electrostatic voltage level rises higher than the threshold voltage of TFT. At this time, the transistor t1 is turned on and the positive electrostatic voltage via the scanning signal line 3 and data signal line 5 is discharged by the transistor t1. Similarly, when negative electrostatic voltage is generated, the transistor t2 discharges the negative electrostatic voltage to achieve ESD protection effect.

When the above TFT ESD protective circuit 11 protects the internal TFT array, the TFT ESD protective circuit 11 itself is in the danger of being damaged by the electrostatic voltage. In the case that the TFT cell is damaged by the electrostatic voltage, the insulating layer of the gate electrode will be broken down by the electrostatic voltage to cause very great leaking current. For example, in the case that the insulating layer of the gate electrode of the TFT t1 is broken down, the knot of gate electrode at the TFT t1 and the source electrode will be short-circuited. This leads to short-circuit of the scanning signal line 3, data signal line 5 and Vcom 6. This will form a defect on the display panel. The defect will result in that the picture cannot be normally shown in the cell test and module driving of the manufacturing procedure. This problem will affect the yield of products. Therefore, it is tried by the applicant to solve the above problem.

SUMMARY OF THE INVENTION

It is therefore a primary object of the present invention to enhance better ESD protective effect than before. Dividing into a positive ESD protective unit and a negative ESD protective unit is better design. The positive ESD protective unit and negative ESD protective unit are independently arranged for respectively discharging positive and negative electrostatic voltages. Each of the positive ESD protective unit and negative ESD protective unit is composed of three TFT for providing multifold ESD protective effect. In the case that the gate electrode insulating layer of any of the three TFT is broken down by electrostatic voltage, the remaining two TFT can still normally operate and keep truly providing ESD protective function. Therefore, the picture still can be normally shown on the display panel and the electrostatic durability of the display is enhanced.

The present invention can be best understood through the following description and accompanying drawings wherein:

DETAILED DESCRIPTION OF THE PREFERRED EMBODIMENT

Figure 1:
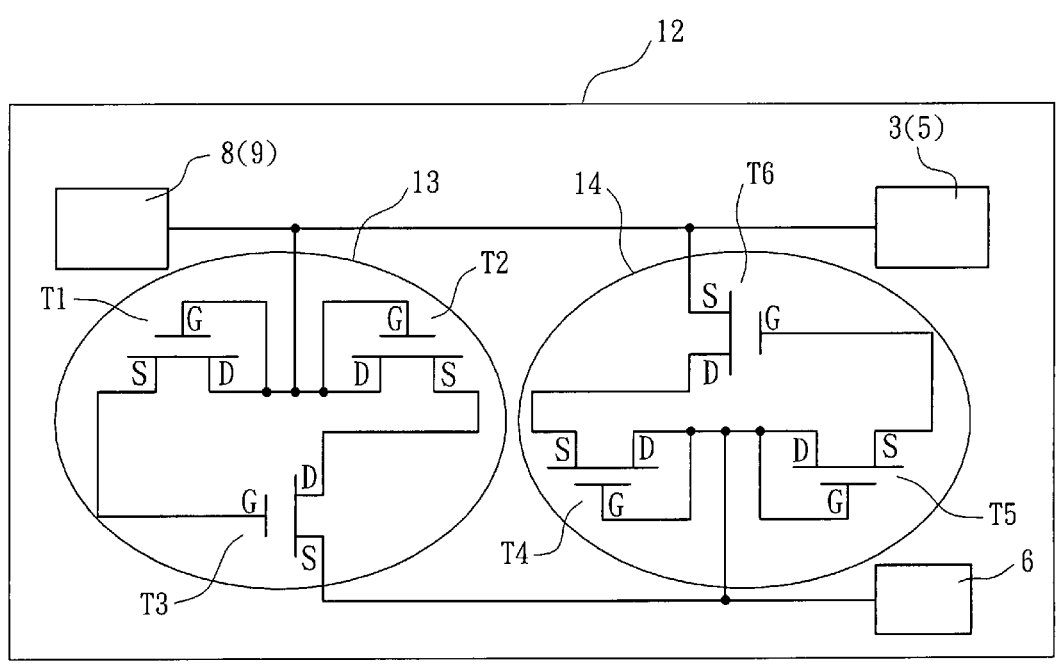
FIG. 1 is a circuit diagram of the ESD protective circuit of the present invention.
Figure 2:
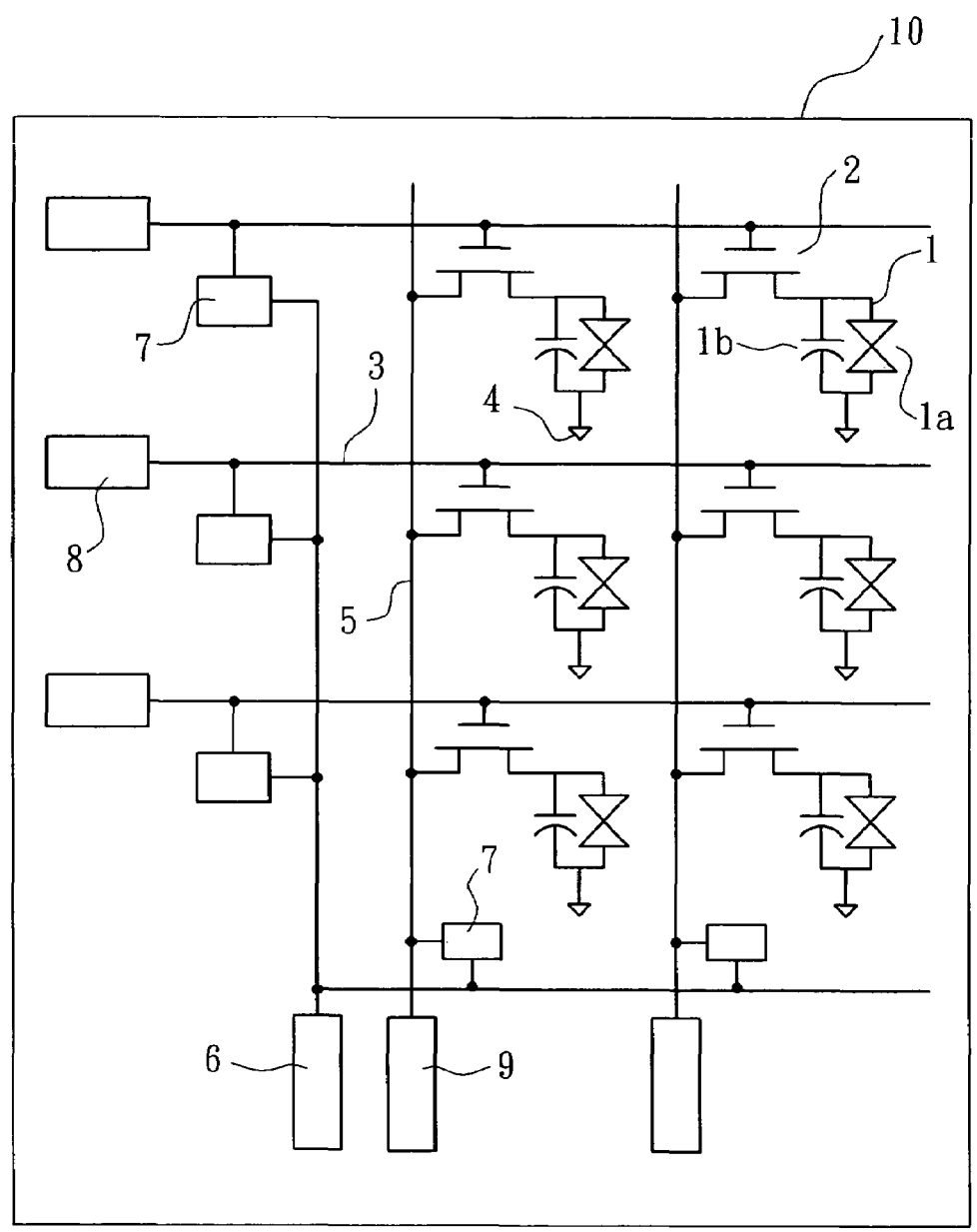
FIG. 2 shows a conventional driving matrix liquid crystal display utilizing TFTs.
Figure 3:
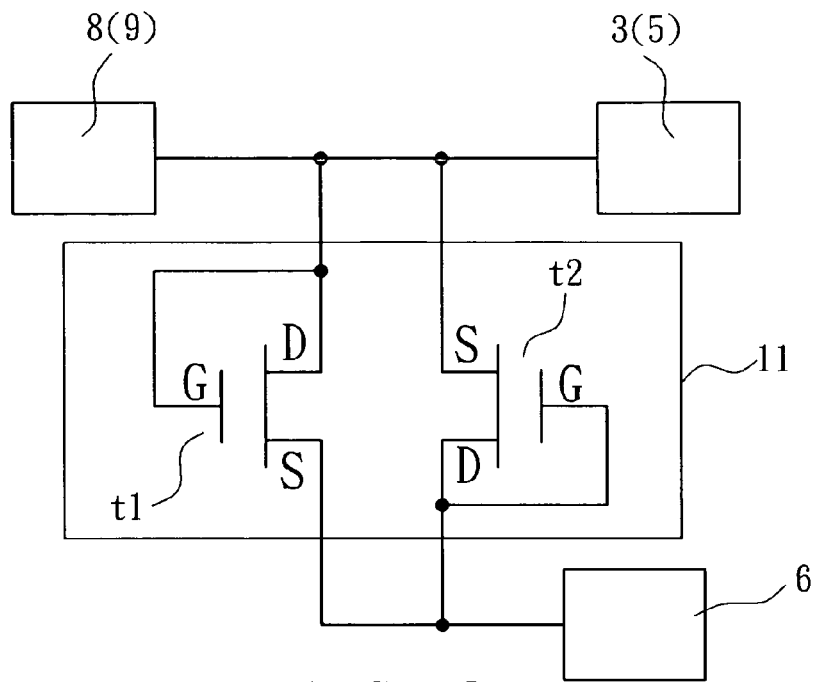
FIG. 3 is a circuit diagram of a conventional ESD protective circuit.
Figure 4:
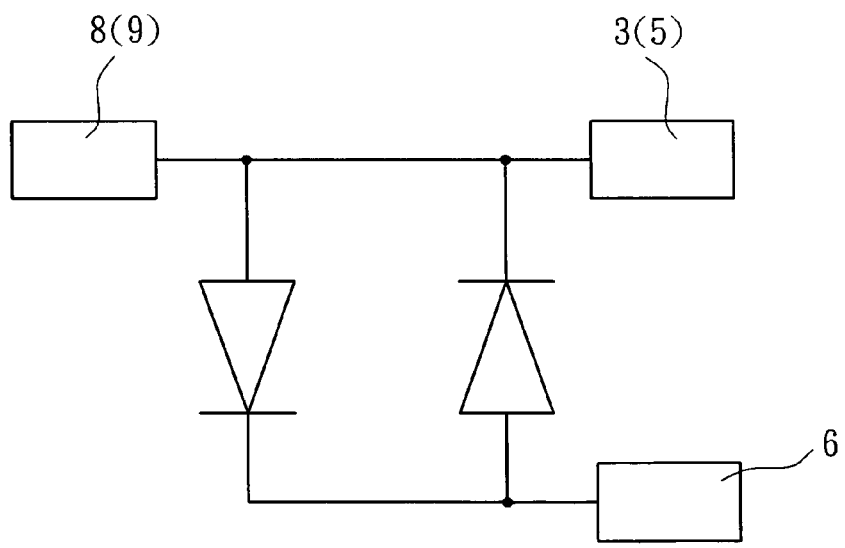
FIG. 4 is a symbol of circuit diagram corresponding to the conventional ESD protective circuit.

Please refer to FIG. 1. The TFT ESD protective circuit of the present invention is disposed between a scanning signal line 3, a data signal line 5 and a Vcom 6. The scanning signal line 3 and data signal line 5 are respectively connected to a scanning line pad 8 and a data line pad 9 of a driving chip. The TFT ESD protective circuit includes a positive ESD protective unit 13 composed of a first TFT T1, a second TFT T2 and a third TFT T3. The gate electrode G and drain electrode D of the first and second TFT T1, T2 are short-circuited and electrically connected with the scanning signal line 3 and data signal line 5. The source electrode S of the first TFT T1 is connected with the gate electrode G of the third TFT T3. The source electrode S of the second TFT T2 is connected with the drain electrode D of the third TFT T3. The source electrode S of the third TFT T3 is connected with the Vcom 6.

The TFT ESD protective circuit further includes a negative ESD protective unit 14 composed of a fourth TFT T4, a fifth TFT T5 and a sixth TFT T6. The gate electrode G and drain electrode D of the fourth and fifth TFT T4, T5 are short-circuited and connected with the Vcom 6. The source electrode S of the fifth TFT T5 is connected with the gate electrode G of the sixth TFT T6. The source electrode S of the fourth TFT T4 is connected with the drain electrode D of the sixth TFT T6. The source electrode S of the sixth TFT T6 is electrically connected with the scanning signal line 3 and data signal line 5.

The TFT ESD protective circuit of the present invention operates in such a manner that when positive electrostatic voltage is generated on the scanning signal line 3 and data signal line 5, the scanning signal line 3 and data signal line 5 are at high potential state. At this time, the positive electrostatic voltage via the scanning signal line 3 and data signal line 5 will go into the positive ESD protective unit 13. The electrostatic voltage rises higher than the TFT threshold voltage so that the electrostatic voltage is sufficient to turn on the first and second TFT T1, T2. In the instance of the first TFT T1 at ON state, the drain electrostatic voltage and source electrode voltage of the first TFT T1 is nearly equal to each other. The source electrode of the first TFT T1 and the gate electrode knot of the third TFT T3 have equal voltage potential. In addition, the voltage level is higher than the TFT threshold voltage. Therefore, the third TFT T3 is turned on. At this time, the first, second and third TFT T1, T2, T3 are all at on state. The positive electrostatic voltage via the second and third TFT T2, T3 is discharged. During the discharging procedure of the positive electrostatic voltage, the fourth, fifth and sixth TFT T4, T5, T6 are all turned off.

In the conventional TFT ESD protective circuit 11, in the case that the insulating layer of the gate electrode at TFT t1 is broken down, the scanning signal line 3 and data signal line 5 will be short-circuited with Vcom. This will lead to abnormal display of the display panel. In contrast to the conventional TFT ESD protective circuit 11, in the TFT ESD protective circuit of the present invention, in the case that the gate insulating layer of any of the first, second and third TFT T1, T2, T3 of the positive ESD protective unit 13 is broken down by the electrostatic voltage when the positive ESD protective unit 13 discharges the positive electrostatic voltage, for example, in the case that the gate insulating layer the first TFT T1 is broken down, the positive electrostatic voltage can be still discharged via the second and third TFT T2, T3. Similarly, in the case that the second TFT T2 is broken down, the positive electrostatic voltage can be still discharged via the third TFT T3. Similarly, in the case that the third TFT T3 is broken down, the positive electrostatic voltage can be still discharged via the first and second TFT T1, T2. Therefore, in the case that any of the three TFT is broken down, the remaining two TFT can still discharge the positive electrostatic voltage to avoid defect of the display panel. Accordingly, the TFT ESD protective circuit of the present invention can truly provide ESD protective effect and the picture still can be normally shown in the cell test and the module driving of the manufacturing procedure.

Similarly, when negative electrostatic voltage is generated, the fourth, fifth and sixth TFT T4, T5, T6 of the negative ESD protective unit 14 are all turned on for eliminating the negative electrostatic voltage. At this time, the first, second and third TFT T1, T2, T3 are all turned off. The negative ESD protective unit 14 has the same function as the positive ESD protective unit 13. In the case that any of the three TFT is broken down, the remaining two TFT can still normally operate to discharge the negative electrostatic voltage to avoid defect of the display panel and truly provide ESD protective effect. In conclusion, the ESD protective circuit of the present invention provides multifold ESD protective effect for the liquid crystal display and enhances the durability thereof.

The above embodiment is only used to illustrate the present invention, not intended to limit the scope thereof. Many modifications of the above embodiment can be made without departing from the spirit of the present invention.

What is claimed is:

1. A TFT ESD protective circuit disposed between a scanning signal line or a data signal line and a Vcom, comprising:
    a positive ESD protective unit composed of a first TFT, a second TFT and a third TFT, the gate electrode and drain electrode of the first and second TFT being short-circuited and connected with the scanning signal line and data signal line, the source electrode of the first TFT being connected with the gate electrode of the third TFT, the source electrode of the second TFT being connected with the drain electrode of the third TFT, the source electrode of the third TFT being connected with the Vcom; and
    a negative ESD protective unit composed of a fourth TFT, a fifth TFT and a sixth TFT, the gate electrode and drain electrode of the fourth and fifth TFT being short-circuited and connected with the Vcom, the source electrode of the fifth TFT being connected with the gate electrode of the sixth TFT, the source electrode of the fourth TFT being connected with the drain electrode of the sixth TFT, the source electrode of the sixth TFT being connected with the scanning signal line and data signal line.

2. The TFT ESD protective circuit as claimed in claim 1, wherein the scanning signal line is electrically connected with the gate electrode and drain electrode of the first and second TFT and connected with the source electrode of the sixth TFT.

3. The TFT ESD protective circuit as claimed in claim 1, wherein the data signal line is electrically connected with the gate electrode and drain electrode of the first and second TFT and connected with the source electrode of the sixth TFT.

4. The TFT ESD protective circuit as claimed in claim 1, wherein the Vcom of the TFT ESD protective circuit connected with the scanning signal line and the TFT ESD protective circuit connected with the data signal line has equal voltage potential.

* * * * *